No. 614,430. Patented Nov. 22, 1898.
H. Y. ARMSTRONG.
MOUSE TRAP.
(Application filed May 8, 1897.)

(No Model.)

WITNESSES:
J. H. Blusch
C. Johnson

INVENTOR:
HARRY Y. ARMSTRONG
By I. N. Thurlow ATT'Y

United States Patent Office.

HARRY Y. ARMSTRONG, OF HANNA CITY, ILLINOIS, ASSIGNOR TO JAMES A. HUNTER AND ROBERT STREHLOW, OF PEORIA, ILLINOIS.

MOUSE-TRAP.

SPECIFICATION forming part of Letters Patent No. 614,430, dated November 22, 1898.

Application filed May 8, 1897. Serial No. 635,676. (No model.)

*To all whom it may concern:*

Be it known that I, HARRY Y. ARMSTRONG, a citizen of the United States, residing at Hanna City, in the county of Peoria and State of Illinois, have invented certain new and useful Improvements in Mouse-Traps; and I do hereby declare that the following is a full, clear, and exact description of the invention, which will enable others skilled in the art to which it appertains to make and use the same.

This invention relates to mouse-traps; and it consists in making the same of corncobs, and also consists in the peculiar construction and arrangement of parts, all of which will be hereinafter described and claimed.

Figure 1:
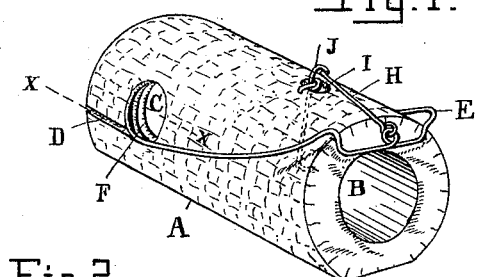
Figure 2:
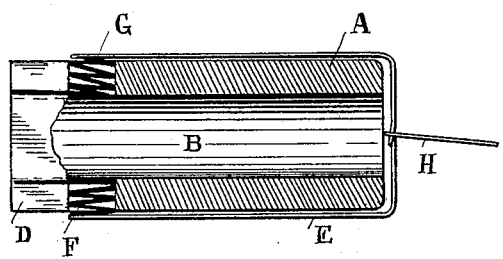
Figure 3:
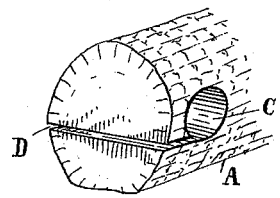

In the accompanying drawings, Figure 1 is a perspective view of a form of my trap, showing same set ready for use. Fig. 2 is a cross-section of the same through line $x$ $x$, Fig. 1, showing form and location of spring. Fig. 3 is a perspective view of the rear end of the trap, showing the peculiar construction of same.

This device is novel in its construction and in the material of which it is made. Its cheapness, simple construction, and simplicity of operation are much in its favor.

In Fig. 1 a form is shown which consists in boring out a section of an ordinary corncob A to form the opening B. The bore or opening B extends only a portion of the way through the cob, and at or near the bottom thereof a hole C is bored through the sides of the cob at right angles to the bore B, as shown. A horizontal saw-kerf D is made through the rear wall of the cob to meet the bottom of the said hole C, as shown in Figs. 1 and 3. A spring is formed by taking a suitable length of wire E and forming a coil F a short distance from one of its ends, which fits snugly within the hole C in one wall of the trap, allowing the short end of the wire to pass into and rest within the slit D, as shown in Fig. 2. Thence the wire is carried forward and bent in such manner as to cross the face of the trap and the bore B, carrying the wire rearwardly on the opposite side of the trap, forming a coil G similar to the coil F and inserting it in the hole C with the short extension lying within the slit D, as before. A loop is formed in the spring-wire E at the forward end, and a locking-bar H is linked loosely therewith. Through the top of the trap a hole I is cut, and within it is hung the usual catch or trigger J by any suitable means. The method by which the trap is set is readily seen in Fig. 1, the spring being raised and set by placing the free end of the locking-bar under the trigger J, using the front edge of the trap as a fulcrum by which to hold the spring.

As may be seen, this trap is vastly different from others of its kind in that the spring is differently constructed and located and held and has a downward instead of an upward motion when released, and, furthermore, the spring passes downwardly past the face of the trap instead of within a slot, thus simplifying construction. The holes C serve a double purpose by holding the springs and admitting light to the interior of the trap, so that the bait is readily seen.

The novelty of this invention lies, as before pointed out, in making the trap of a corncob and in the form given it, and Therefore what I claim as new, and desire to secure by Letters Patent, is—

In a mouse-trap, a corn cob having a longitudinal bore and a transverse bore at right angles to said longitudinal bore, a slit cut into the rear end of the cob to open into said transverse bore, substantially as described, in combination with a spring having a coil formed near each of its extremities, said coils lying within the transverse bore, the free extremities of said spring lying within the said slit in the rear end of the cob, a locking-bar loosely secured to the forward end of the spring, and a catch or trigger pivoted in the top of the trap to engage the said locking-bar as set forth.

In testimony whereof I affix my signature in presence of two witnesses.

HARRY Y. ARMSTRONG.

Witnesses:
C. JOHNSON,
J. H. BLUSCH.